Patented Jan. 27, 1931

1,790,097

UNITED STATES PATENT OFFICE

HANS PAUL KAUFMANN, OF JENA, GERMANY, ASSIGNOR TO I. G. FARBENINDUSTRIE AKTIENGESELLSCHAFT, OF FRANKFORT-ON-THE-MAIN, A CORPORATION OF GERMANY

NEW PROCESS FOR INTRODUCING SULPHOCYANIC GROUPS IN ORGANIC COMPOUNDS

No Drawing. Application filed August 21, 1926, Serial No. 130,770, and in Germany August 27, 1925.

The present invention relates to a new process for introducing sulphocyanic groups into organic compounds and to new products obtainable thereby.

My new process consists in causing an inorganic sulphocyanic salt in solution together with a halogen to react on an organic compound.

The reaction can be effected in an aqueous or an acid medium, the new process being therefore of wide application and allowing the production of various organic sulphocyanic compounds of different classes on a technical scale.

It is possible to introduce one or more sulphocyanic groups into aliphatic as well as aromatic compounds according to the capability of the organic compound in question of forming derivatives.

When using aromatic compounds as starting materials, I prefer to use such aromatic compounds as are substituted by a substituent of the group including amino, substituted amino, hydroxyl, and the desmotropic keto group. It is well known in the art that these compounds possess a labile hydrogen atom and are in consequence thereof highly reactive.

The following scheme of formulas may illustrate the probable course of reaction, however I do not wish to bind myself to this scheme in any way.

The introduction of a sulphocyanic group into aniline may be taken as a simple example:

(1) $2NaSCN + Br_2 = 2NaBr + (SCN)_2$

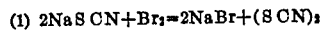
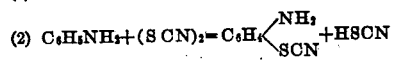

(2) $C_6H_5NH_2 + (SCN)_2 = C_6H_4{<}^{NH_2}_{SCN} + HSCN$

The organic sulphocyanic compounds, which are obtainable by my new process in a pure state with a very good yield, have probably the general formula:

R(SCN)$_n$ wherein R means an organic residue of the aliphatic or aromatic series, which may contain further substituents, $n$ means the number 1 or 2. They are valuable from a therapeutical point of view and as intermediates for the production of dyestuffs. They form various products of conversion, which are suitable for producing dyestuffs of different classes.

In order to obtain these products of conversion it is not necessary to isolate the organic sulphocyanic compounds. For instance one may saponify immediately a formed sulphocyanic compound by adding an alkaline lye to the reaction mass in order to form the corresponding disulfide, whereas by further adding a reducing agent mercaptans are obtained.

In order to further illustrate my invention the following examples are given; I wish it however understood that I am not limited to the particular examples given nor to the specific conditions mentioned. The parts are by weight and all temperatures in centigrades.

Example 1

(a) 25 parts of sodium sulphocyanide are dissolved in 150 parts of acetic acid (of 96% strength). Then ethylene and chlorine are allowed to pass through the solution, while well cooling and stirring, the ethylene supply being maintained always in excess. When the reaction is finished, the formed ethylene-disulphocyanide is partly found in the precipitate, partly in solution and can be extracted therefrom by means of organic solvents, for instance, ether. The ethereal solution is agitated with a sodium carbonate solution and the ether is evaporated. The ethylene-disulphocyanide or 1.2-disulphocyanogeno-ethane of the formula:

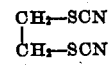

$CH_2$—SCN
$CH_2$—SCN is soluble in water and the usual organic solvents and melts in a pure state at 90° (see Archiv der Pharmazie (2) vol. 85, page 1).

(b) 10 parts of sodium sulphocyanide are dissolved in 60 parts of hydrochloric acid of 15% strength. Then a strong current of ethylene is allowed to pass through the well cooled solution and 6 parts of bromine, dissolved in a suitable amount of hydrochloric acid, are dropped in slowly. The formed ethylene-disulphocyanide is isolated, as described above.

In the same manner sulphocyanic groups may be introduced into acetylene.

*Example 2*

10 parts of styrol are dissolved in 50 parts of acetic acid (96%). Then a solution of 20 parts of sodium sulphocyanide in 200 parts of the same solvent is added. This mixture is well cooled down and 1,6 parts of bromine, dissolved in the same solvent, are dropped in slowly. After some minutes the clear solution is poured into the same volume of water. The product of reaction, separating at first as an oil, solidifies after some time to a pulp of crystals, yielding when recrystallized from water, the 1-phenyl-1,2-disulphocyanogen-ethane of the formula:

melting at 101° (see Liebigs Annalen vol. 216, page 324).

*Example 3*

90 parts of sodium sulphocyanide are dissolved in 500 parts of acetic acid and 2,8 parts of anethol are added. Then 32 parts of bromine are allowed to flow into slowly while well cooling. After short time the same volume of water is added and after some time the product of reaction separates. The formed 1-p-methoxy-phenyl-1.2-disulphocyanogenopropan of the formula:

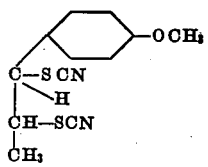

melts, when recrystallized from carbondisulfide and ether, at 87°. (see Ber. deutsch. pharm. Ges. vol. 33, page 139).

*Example 4*

(a) 5,6 parts of aniline are added to 100 parts of a saturated aqueous solution of ammonium sulphocyanide. Then 9,6 parts of bromine are allowed to flow into the solution while well stirring and cooling. After cooling the solution with a freezing mixture for some time the formed para-sulphocyanogeno-aniline of the formula

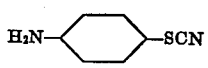

separates in form of the sulphocyanic salt. It is decomposed by washing it with a sodium carbonate solution. The para-sulphocyanogen-aniline thus obtained melts, when recrystallized from hot water, at 57–58° (see Liebigs Annalen vol. 419, page 271).

(b) A solution of 4,6 parts of aniline in 120 parts of acetic acid is mixed with a solution of 250 parts of sodium sulphocyanide in 1300 parts of acetic acid. Then 96 parts of bromine are dropped into the mixture while well cooling and stirring. After some time the formed para-sulphocyanogeno-aniline separates almost colorless from the well cooled solution.

The filtrate is diluted with about the triple volume of water and neutralized with solid sodium carbonate. The separated crystals melt, when recrystallized from water, at 198°. They are probably the hitherto unknown 2.4-disulphocyanogeno-aniline of the formula:

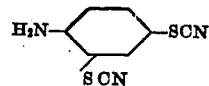

*Example 5*

2 parts of diphenylamine are dissolved in 75 parts of dilute sulfuric acid (15 p. c.) and then 20 parts of sodium sulphocyanide are added, dissolved in the same solvent. A solution of the calculated quantity of bromine in dilute sulfuric acid is introduced while well cooling, and the solution is cooled by a freezing mixture. After some time the formed para-disulphocyanogeno-diphenylamine of the formula

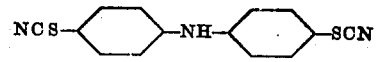

separates in form of yellow flakes. When recrystallized from dilute alcohol it melts at 120° (see Liebigs Annalen, vol. 419, page 276).

*Example 6*

14 parts of salicylic acid and 40 parts of sodium sulphocyanide are dissolved in 300 parts of formic acid while warming. Then 30 parts of bromine, dissolved in the same solvent, are added. Eventually separating products of polymerization are removed by filtration. Then the solution is poured into water and extracted with organic solvents. After evaporating them the residual 5-sulphocyanogeno-salicylic acid of the formula

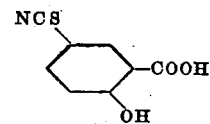

is obtained, melting in a pure state at 165° (see Ber. deutsch. chem. Ges., vol. 56, page 2519 and vol. 58, page 1556).

*Example 7*

42 parts of α-naphthol are dissolved in 200 parts or acetic acid and 90 parts of sodium sulphocyanide are dissolved in 650 parts of acetic acid (96%) and to the mixture of both solutions 48 parts of bromine, dissolved in 150 parts of acetic acid, are added in the described manner. The clear solution is then diluted with about the triple quantity of water and after some time a pulp of crystals separates. They are filtered and dissolved in ether, the ether is evaporated and the residue is recrystallized from carbon disulfide. In this manner 4-sulphocyanogeno-1-naphthol of the formula:

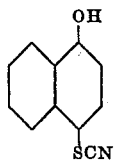

melting at 113°, is obtained (see Ber. d. deutsch. chem. Ges. vol. 58, page 1555).

*Example 8*

10 parts of α-naphthol are dissolved in 120 parts of acetic acid and 80 parts of potassium sulphocyanide are dissolved in 350 parts of acetic acid and to the mixture of both solutions 19 parts of bromine, dissolved in 120 parts of acetic acid, are added in the described manner. The shortly separating pulp of crystals is filtered and washed. The residue is dissolved in alcohol and the alcoholic solution is precipitated by addition of water. In this manner as a new compound 2.4-disulphocyanogeno-1-naphthol of the probable formula

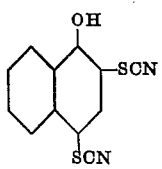

is obtained in form of yellowish needles, melting at 118–119° under decomposition.

In the same manner one or two sulphocyanic groups may be introduced in β-naphthol.

*Example 9*

(a) 20 parts of α-naphthylamine are suspended in 400 parts of a saturated aqueous solution of ammonium sulphocyanide, then 30 parts of bromine are added while well cooling. The separated reddish product of reaction is filtered, washed with a sodium carbonate solution and recrystallized from alcohol. As a new compound 2.4-disulphocyanogeno-1-naphthylamine of the probable formula

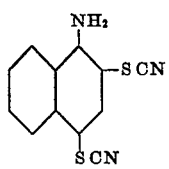

is obtained, it is easily soluble in the usual organic solvents, melting at 204°.

(b) 42 parts of α-naphthylamine are dissolved in 200 parts of acetic acid and 170 parts of sodium sulphocyanide are dissolved in 880 parts of acetic acid and to the mixture of both solutions 96 parts of bromine, dissolved in 250 parts of acetic acid, are added. The formed white precipitate is filtered and recrystallized from alcohol. It is identical with the aforesaid 2.4-disulphocyanogeno-1-naphthylamine.

*Example 10*

A solution of 71 parts of β-naphthylamine in 450 parts of acetic acid is mixed with a solution of 160 parts of sodium sulphocyanide in 1200 parts of acetic acid. To the mixture, in which partly the sulphocyanic salt of β-naphthylamine separates, 80 parts of bromine, dissolved in 350 parts of acetic acid, are added while cooling. During the addition of bromine the precipitate disappears and the solution becomes clear. When the whole quantity of bromine is dropped into the solution, a new precipitate separates, which is filtered and washed with sodium carbonate solution. When recrystallized from alcohol, benzene or carbon tetrachloride, a new body is obtained, easily soluble in the usual solvents, and melting at about 261° with a total decomposition after having frit at 150–154°. It is probably the hitherto unknown 1-sulphocyanogeno-2-naphthylamine of the formula

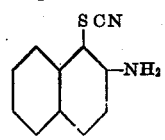

It is advisable to carry out the reaction at lower temperatures by cooling the mass, or, when working at ordinary temperatures, to isolate immediately the 1-sulphocyanogeno-2-naphthylamine formed, as otherwise when allowing the reaction mass to stand or on warming it, the isomeric thiazole compound is obtained.

*Example 11*

19 parts of antipyrin and 20 parts of sodium sulphocyanide are dissolved in 300 parts of acetic acid. Then 16 parts of bromine dissolved in the same solvent are dropped in.

The mixture containing the monosulphocyanic derivative of antipyrin is diluted with the same volume of water and caustic soda lye is added until a feeble alkaline reaction in order to obtain the corresponding disulfide. After short time yellow crystals separate in a good yield from the yellowish liquor. They are filtered, washed and dried. In this manner the bis (1-phenyl-2.3-dimethyl-5-pyrazolonyl-4) disulfide of the formula:

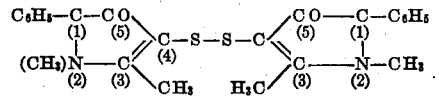

is obtained in a pure state without any further purification, showing immediately the melting point of 256°, given in literature for this product.

I claim:

1. A process which comprises causing an inorganic sulphocyanic salt and a halogen to act in an organic acid solution on an organic compound.

2. A process which comprises causing an inorganic sulphocyanic salt and a halogen to act in an acetic acid solution on an organic compound.

3. A process which comprises causing an inorganic sulphocyanic salt in a dissolved form and a halogen to act on an aromatic compound of the naphthalene series.

4. A process which comprises causing an inorganic sulphocyanic salt in a dissolved form and a halogen to act on a naphthylamine body.

5. As new products organic sulphocyanic compounds of the formula:

$$C_{10}X_{7-n}(NH_2)(SCN)_n$$

in which formula the X's mean hydrogen atoms, of which one or more may be replaced by a monovalent substituent, $n$ means the number 1 or 2, which compounds are when dry almost colorless powders, soluble in the usual organic solvents.

6. As a new product 1-sulphocyanogeno-2-naphthylamine of the formula:

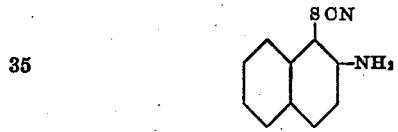

melting at about 261°, soluble in the usual organic solvents.

7. A process which comprises causing an inorganic sulphocyanic salt in a dissolved form and a halogen to act on an aromatic compound which is substituted by a substituent having a labilizing effect of the group including amino, substituted amino, hydroxyl, and the desmotropic keto group and which may be further substituted.

8. A process which comprises causing an inorganic sulphocyanic salt in a dissolved form and a halogen to act on a compound of the naphthalene series which is substituted by a substituent having a labilizing effect of the group including amino, substituted amino, hydroxyl, and the desmotropic keto group and which may be further substituted.

9. A process which comprises causing an inorganic sulphocyanic salt and a halogen to act in an organic acid solution on an aromatic compound.

In testimony whereof, I affix my signature.

HANS PAUL KAUFMANN.